No. 811,439.

PATENTED JAN. 30, 1906.

C. RITTS.
SAW TOOL.
APPLICATION FILED APR. 3, 1905.

2 SHEETS—SHEET 1.

Witnesses
Forrest G. Smith
C. H. Griesbauer

Inventor
Collins Ritts
by H. B. Willson
Attorney

No. 811,439. PATENTED JAN. 30, 1906.
C. RITTS.
SAW TOOL.
APPLICATION FILED APR. 3, 1905.
2 SHEETS—SHEET 2.

Witnesses
Forrest G. Smith
C. H. Griesbauer

Inventor
Collins Ritts
by H. B. Willson
Attorney

UNITED STATES PATENT OFFICE.

COLLINS RITTS, OF SHINGLETON, CALIFORNIA.

SAW-TOOL.

No. 811,439.          Specification of Letters Patent.          Patented Jan. 30, 1906.

Application filed April 3, 1905. Serial No. 253,522.

*To all whom it may concern:*

Be it known that I, COLLINS RITTS, a citizen of the United States, residing at Shingleton, in the county of Shasta and State of California, have invented certain new and useful Improvements in Saw-Tools; and I do declare the following to be a full, clear, and exact description of the invention, such as will enable others skilled in the art to which it appertains to make and use the same.

This invention relates to saw-tools, and is designed for the purpose of jointing, facing, and cutting drags of crosscut-saws; and one of the objects of the same is to provide a tool of comparatively simple construction which can be used for jointing and facing the saw-teeth and for cutting the drags the proper height relatively to the teeth.

Another object is to provide a tool of this character which can be quickly adjusted in position and which will operate efficiently and accurately for its purpose.

These objects are attained by means of the construction shown in the accompanying drawings, in which—

Figure 1:
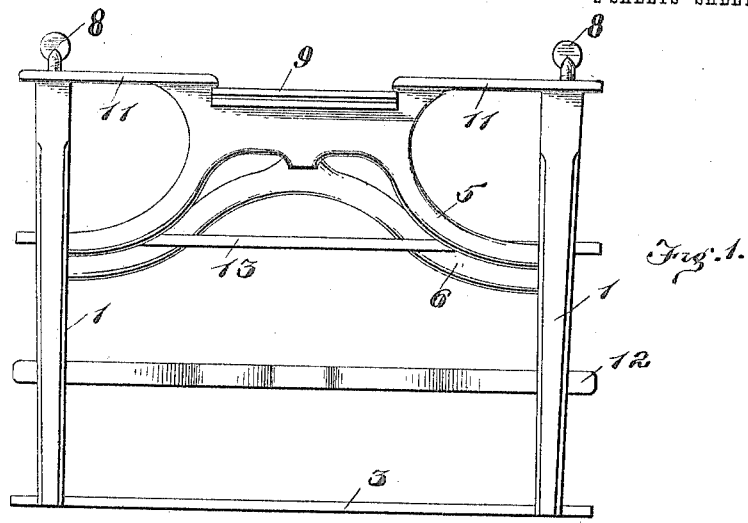
Figure 2:
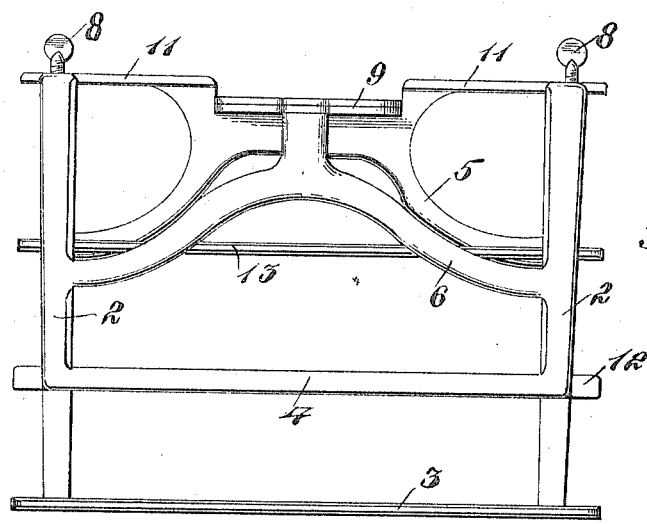
Figure 3:
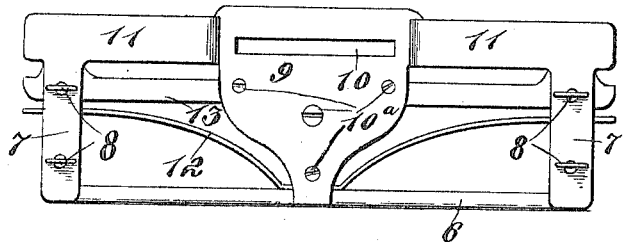
Figure 5:
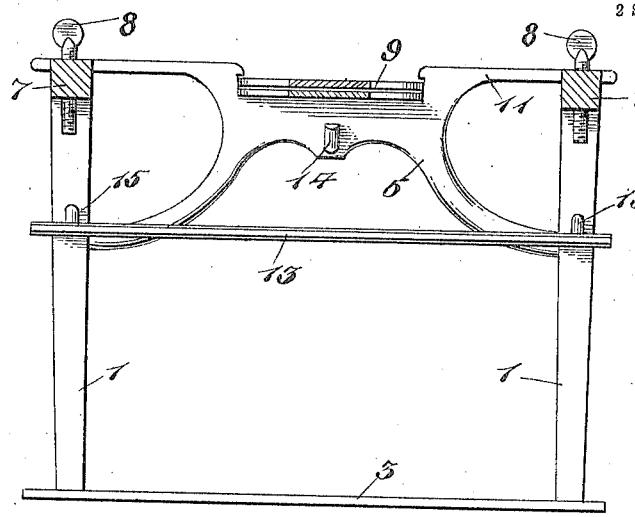
Figure 6:
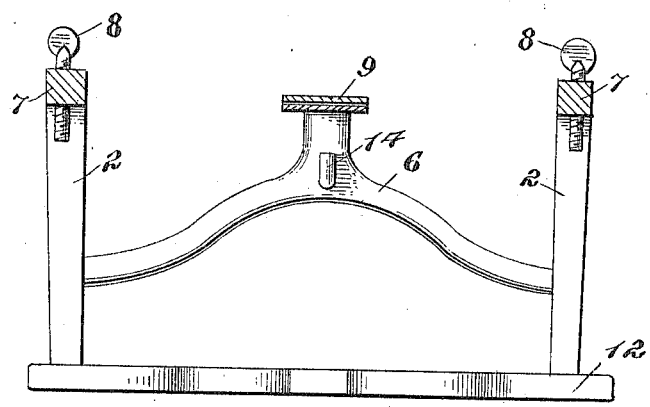
Figure 4:
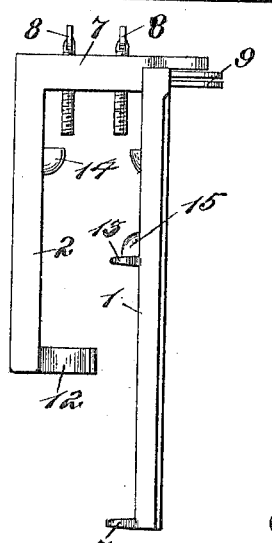

Figure 1 is a front elevation of a tool made in accordance with my invention. Fig. 2 is a rear elevation of the same. Fig. 3 is a plan view of the same. Fig. 4 is an end elevation of the tool. Fig. 5 is a longitudinal vertical section through the body portion of the tool; and Fig. 6 is a similar view showing another portion of the tool.

Referring to the drawings for a more particular description of my invention the numeral 1 designates the standards upon one side of the tool, and the numeral 2 represents the standards upon the opposite side thereof. These standards are connected together by cross-bars 3 and 4 and by braces 5 and 6. At the upper ends of the standards bearing-blocks 7 connect the front and rear standards and passing through these bearing-blocks are four binding-screws 8. Extending across and resting upon the braces 5 and 6 is a drag-plate 9, provided with a slot 10, through which the drag of the saw is adapted to pass and hold the same in position for dressing it. This drag-plate is composed of two plates of similar contour, the upper one of which is adjustable vertically of the lower one by means of a series of screws 10 or by similar means. Line-plates 11 extend from the outer ends of the frame of the tool inward to the drag-plate upon opposite sides thereof, said plates serving as bearings for the teeth of the saw when the tool is used in cutting drags. A spring 12 is secured centrally to the cross-bar 4. A guide-bar 13 extends from one of the front standards to the other, and the saw to be operated upon is clamped between the spring 12, the guide-bar 13, and the cross-bar 4. Formed upon the braces and extending inwardly toward each other are a pair of lugs 14, said lugs being located immediately under the rear portion of the drag-plate. A file may be placed flatwise upon the two lugs 14, and the binding-screws 8 are used for springing the opposite ends of the file to the required curvature to properly joint the saw-teeth. A pair of lugs 15, located beyond the front standards immediately above the guide-bar 13, serves to hold the file edgewise in line with opposite binding-screws, and the file is held in this position for facing the saw-teeth. For cutting the drags the saw-blade rests against the front standards and the drag-tooth projects through the slot in the drag-plate, the teeth of the saw bearing against the line-plates, as will be understood.

From the foregoing the construction and operation of my invention will be understood without a more extended description.

Various changes in the form, proportion, and the minor details of construction may be resorted to without departing from the principle or sacrificing any of the advantages of this invention.

Having thus fully described my invention, what I claim as new, and desire to secure by Letters Patent, is—

In a saw-tool, the combination of a frame, line-plates 11, an intermediate drag-plate 9, standards 1 for supporting said plates, a guide-bar 13 connecting said standards, a bearing-spring 12 on the frame, a file-holder comprising a series of lugs 14, 15 extending laterally on the inside of the frame and set-screws 8 extending vertically through the top of the frame to hold a file in place upon the lugs, substantially as described.

In testimony whereof I have hereunto set my hand in presence of two subscribing witnesses.

COLLINS RITTS.

Witnesses:
ROBERT BINNER,
B. F. CHASE.